United States Patent [19]

Ohno et al.

[11] Patent Number: 5,460,508
[45] Date of Patent: Oct. 24, 1995

[54] RESIN MOLDING METHOD AND APPARATUS

[75] Inventors: Masakazu Ohno; Chuzo Simizu; Osamu Nakazawa, all of Tokyo, Japan

[73] Assignee: Sankyo Kasei Kabushiki Kaisha, Tokyo, Japan

[21] Appl. No.: 226,687

[22] Filed: Apr. 12, 1994

[30] Foreign Application Priority Data

| Apr. 12, 1993 | [JP] | Japan | 5-084732 |
| Jul. 20, 1993 | [JP] | Japan | 5-178725 |
| Dec. 6, 1993 | [JP] | Japan | 5-305195 |
| Jan. 19, 1994 | [JP] | Japan | 6-004103 |

[51] Int. Cl.[6] ..................... B29C 45/24
[52] U.S. Cl. .......... 425/554; 264/37; 264/328.9; 425/556; 425/564; 425/566; 425/577; 425/DIG. 51; 425/DIG. 224
[58] Field of Search .................. 264/37, 328.9; 425/562, 564, 565–567, 568, 571, 577, DIG. 51, DIG. 224, 553, 554, 556, 572

[56] References Cited

U.S. PATENT DOCUMENTS

| 2,613,395 | 10/1952 | Massler . | |
| 2,698,460 | 1/1955 | Amo | 264/328.9 |
| 2,698,464 | 1/1955 | Wilson | 264/328.9 |
| 3,112,523 | 12/1963 | Goulet et al. | 264/328.9 |
| 3,824,298 | 7/1974 | Sherer | 264/328.9 |

Primary Examiner—Jill L. Heitbrink
Attorney, Agent, or Firm—Sughrue, Mion, Zinn, Macpeak & Seas

[57] ABSTRACT

To provide a resin molding method and apparatus that may realize a sprue runnerless system with a very simple structure and at a low cost, a molten resin 4 is fed from a resin supply portion 1 into a pair of cavities 3 through a resin passages 2 such as a sprue portion 2A and a pair of runner portion 2B for molding the resin. The method includes the following steps of: moving a resin return member 5 toward the resin supply portion 1 after supplying the molten resin 4 into the cavities 3, the resin return member 5 being disposed so as to be projectable into the resin passage 2 and movable through the resin passage 2; and returning a waste molded resin 6 under a molten/solid condition within the resin passage 2 back into the resin supply portion 1 under a molten condition by a heat of the resin supply portion 1.

6 Claims, 10 Drawing Sheets

RESIN MOLDING METHOD AND APPARATUS

BACKGROUND OF THE INVENTION

The present invention relates to a resin molding method and a resin molding apparatus for molding resin by feeding molten resin into a cavity through molten-resin passages such as a sprue portion and a runner portion from a resin supply portion.

In a conventional molding process, an injection nozzle (i.e., molten-resin supply portion) is provided at an end of a cylinder and the molten resin held within the cylinder is supplied from the injection nozzle into a cavity through molten-resin passages such as a sprue portion, a gate portion and a runner portion. Then, an interior of the cavity is cooled down to a predetermined temperature so that the resin held within the cavity is solidified or cured to produce a molded article. Subsequently, molding dies are separated to open the cavity and the molded article is removed away from the cavity.

In this case, in the conventional molding process, an unnecessary additional material which is molded in the molten-resin paths and which is referred to as a runner (i.e., a sprue runner) is unavoidable at the time when the molded article is removed.

Conventionally, since the "runner" is wasted, in order to save the material, the runner is pulverized and reused.

However, a runner removal work and a sorting work to sort the runner and the molded article are so troublesome and a recycle system is very complicated.

For this reason, a so-called hot runner system has been developed in which the molten-resin paths are always heated in molding, and the runner is forcibly caused not to be solidified so that the runner is not discharged.

However, in the runnerless system such as the hot runner system, since the heating means has to be provided around the cavity which is intrinsically or inherently cooled, a heat-insulating structure has to be interposed between the heating means and the cavity, as a result of which a total cost is unduly increased. This system is not practical.

Accordingly, in general, the former system has been widely used in which the runner is removed and reused for molding.

SUMMARY OF THE INVENTION

Accordingly, in view of the above-noted difficulties, an object of the present invention is to provide a unique, excellent molten resin molding machine and a method therefor, in which a runner is not discharged with a very simple means without depending only upon a heating means such as a hot runner sub-system.

According to the present invention, there is provided a resin molding method in which molten resin is fed from a resin supply portion into a cavity through a resin passage including at least one sprue portion and a runner portion for molding the resin, the method comprising the following steps of:

moving a resin return member toward the resin supply portion after supplying the molten resin into the cavity, the resin return member being disposed so as to be projectable into the resin passage and movable through the resin passage; and returning a waste molded resin under a molten/solid condition within the resin passage back into the resin supply portion under a molten condition by a heat of the resin supply portion.

The returning step includes the step of:

after the molten resin has been fed into the cavity and then a molded article within the cavity has been solidified, moving the resin return member to return the waste molded resin kept under a solid/semisolid condition toward the resin supply portion and to return the waste molded resin back into the resin supply portion under a molten condition by heat of the resin supply portion.

The returning step includes the steps of:

closing a gate portion for the cavity by a side portion of the resin return member; and closing an injection supply port for the resin supply portion by a distal end portion of the resin return member.

The resin return member may be composed of a rod-like member that moves back and forth, and wherein rod-like member is moved forwardly through the sprue portion toward the resin supply portion to thereby return the waste molded resin back into the resin supply portion.

After the waste molded resin has been returned back into the resin supply portion, a plug mechanism is operated to make the resin supply portion disable to perform an injection up to a next injection for molding resin.

According to another aspect of the invention, there is provided a resin molding apparatus in which molten resin is fed from a resin supply portion into a cavity through a resin passage including at least one a sprue portion and a runner portion for molding the resin, the apparatus comprising a resin return member disposed movably through the resin passage for returning a waste molded resin kept under a molten/solid condition within the resin passage with a heat of the resin supply portion when the resin return member is projected into the resin passage and moved through the resin passage toward the resin supply portion.

The apparatus may further include a means for controlling the resin return member to move for return of the resin toward the resin supply portion, after the molten resin has been fed into the cavity and the molded resin within the cavity has been solidified.

The resin return member has a gate closing portion for closing a gate portion to the cavity when the resin return member is moved for returning the resin, the gate closing portion being formed at a side portion of the resin return member, and wherein the resin return member further has a supply closing portion for closing an injection supply port of the resin supply portion, the supply closing portion being formed at a distal end portion of the resin return member.

A nozzle portion having a smaller diameter is not provided at an injection supply port of the resin supply portion, and the resin supply portion has substantially the same diameter as that of the sprue portion.

The resin return member may be composed of a rod-like member that is movable back and forth, and the rod-like member is movable through the sprue portion toward the resin supply portion for returning the waste molded resin within the sprue portion back into the resin supply portion.

A plug mechanism may be interposed in the resin supply portion for switching over an injection enable condition and an injection disable condition, and a switching mechanism is provided for operating the plug mechanism for the injection disable condition in an injection unnecessary condition up to a next injection for molding resin after the waste molded material has been returned back into the resin supply portion by the movement of the resin return member.

A heat insulating portion may be provided around the sprue portion for heat-insulating the cavity and the sprue portion.

After the molten resin has been fed into the cavity through the resin passage from the resin supply portion, the resin return member is projected into the resin passage and further moved toward the resin supply passage to thereby return the waste molded resin within the resin passage back into the resin supply portion. The wasted molded resin is returned into the resin supply portion under the molten condition by the heat of the resin supply portion.

DESCRIPTION OF THE PREFERRED EMBODIMENTS

The present invention will now be described with reference to the accompanying drawings.

Figure 1:
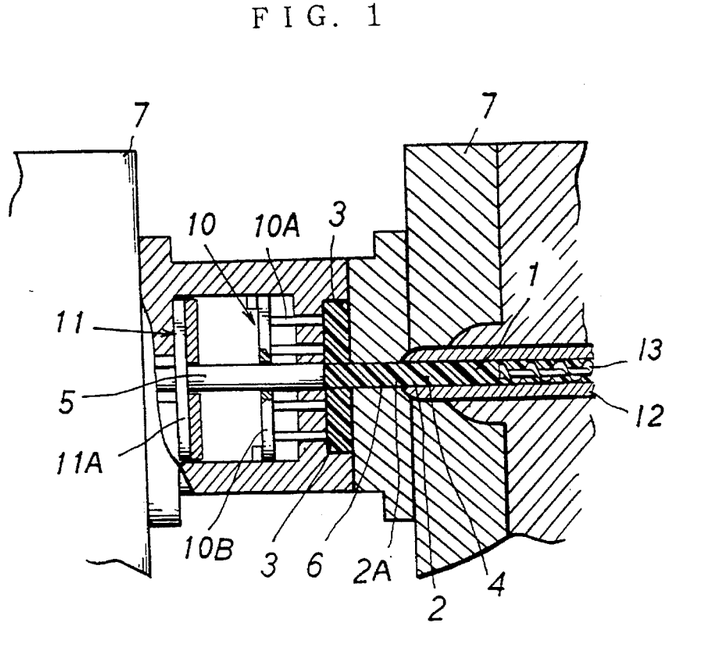
FIG. 1 is a schematic cross-sectional view of an apparatus upon resin-supply in accordance with a first embodiment of the invention.
Figure 2:
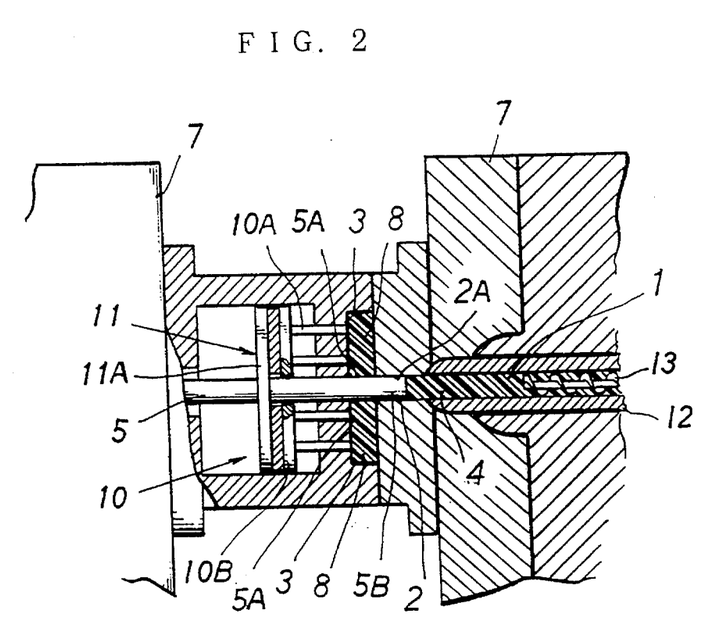
FIG. 2 is a schematic cross-sectional view of the apparatus upon the operation of a resin return member after the resin-supply in accordance with the first embodiment.
Figure 3:
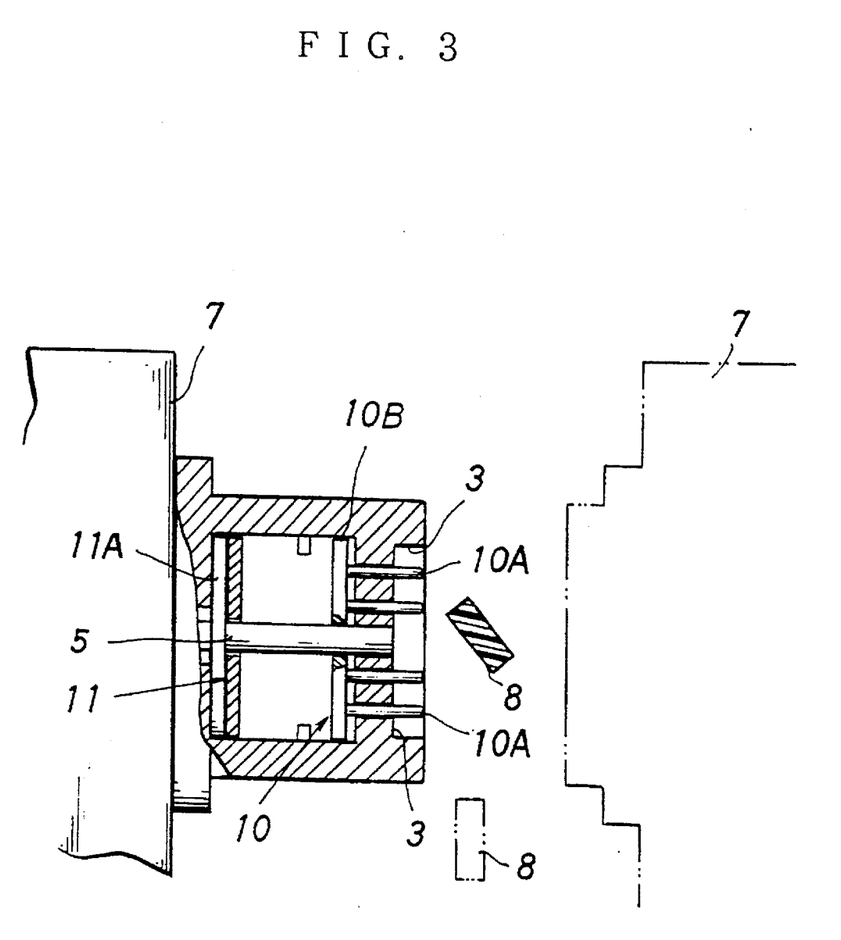
FIG. 3 is a schematic cross-sectional view illustrating a state of a resin article discharge after the separation of modes in accordance with the first embodiment.
Figure 4:
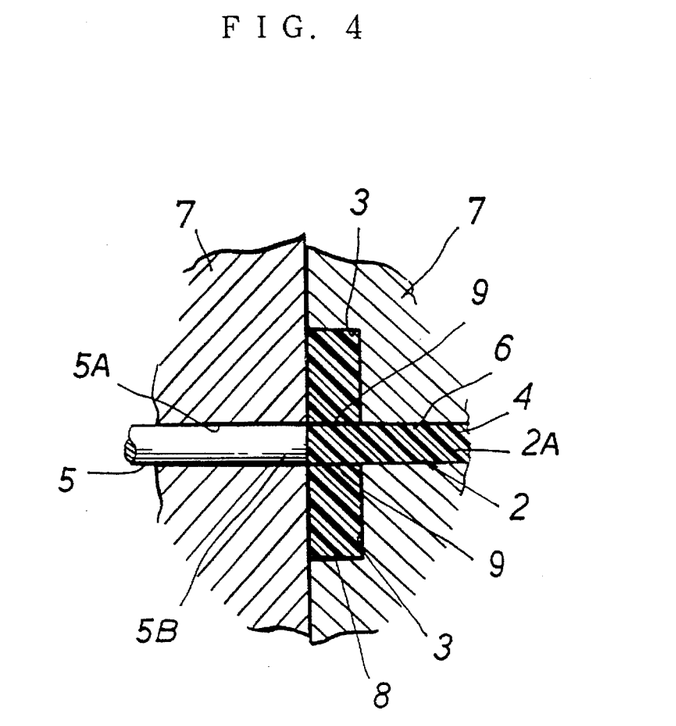
FIG. 4 is an enlarged cross-sectional view showing a primary part of the apparatus during the resin injection in accordance with the first embodiment.

Referring now to FIGS. 1 through 4, an embodiment of the invention will be described. A molten-resin molding method for molding molten resin 4 by supplying the molten resin 4 from a molten resin supply portion 1 into a pair of cavities 3 through a molten-resin runner path 2, defined by a sprue portion 2A, and a pair of gate portions 9 (FIG. 4). The molten resin 4 is fed into the cavities 3 by the operation of a screw 13 and a molded article 8 is cured within the cavities 3. Thereafter, a rod-like resin return member 5 is projected into the sprue portion 2A and moved toward the resin supply portion 1 so that the waste semisolid molded material 6 is returned back to the resin supply portion 1 under a molten state by a heat at the resin supply portion 1. In this case, the gate portions 9 for the cavities 3 are closed by a pair of gate closing portions 5A at both sides of the resin return member 5 through the movement of the resin return member 5. Thus, the injection supply inlet port of the resin supply portion 1 is closed by a supply closing portion 5B at a distal end of the resin return member 5.

The apparatus for performing the above-described process is shown in FIGS. 1 to 4.

In the embodiment shown in these figures, it may be said that the apparatus has only the so-called sprue portion 2A. The cavities 3 are arranged on the right and left sides of the sprue portion 2A, and the runner portion 2 for connecting the cavities 3 with each other is dispensed with. It may be also said that a pair of small runner portions 2B are present between the sprue portion 2A and the cavities 3.

In the embodiment, a return ejector device 11 is drivingly moved by a drive source of a discharge ejector device 10 for discharging molded articles 8 held within the cavities 3 by ejector rods 10A under the condition that a mold die 7 is moved away from an associated mold die to open the cavities 3. The rod-like resin return member 5 projects toward the sprue portion 2A around a moving plate 11A of the return ejector device 11.

The resin return member 5 is constructed so that its distal end may close the end portion of the sprue portion 2A before starting the movement of the moving plate 11A. After the molded articles 8 held within the cavities 3 have been hardened or cured, the moving plate 11A of the return ejector 11 is moved forwardly so that the rod-like resin return member 5 is projected into the sprue portion 2A and further moved into the resin supply portion 1. As a result, the semisolid waste molded material 6 is returned back to the resin supply portion 1. After the semisolid waste molded material 6 in the sprue portion 2A has been returned back, peripheral portions of the resin return member 5 are used as gate closing portions 5A which are adapted to close the right and left gate portions 9 serving as the supply port portions for the cavities 3. As a result, the supply port closing portion 5B formed at the distal end of the resin return member 5 is linearly moved toward the resin supply portion 1 to close the resin supply portion 1.

Thus, the waste molded material 6 within the runner portion 2 is returned back by the movement of the resin return member 5, and the waste molded material 6 is returned back to the resin supply portion 1 under the molten condition by the heat of the resin supply portion 1. At the same time, the resin supply portion 1 is closed by the resin return member 5. Incidentally, the supply portion closing portion 5B at the distal end of the resin return member 5 may be inserted into the deep portion of the injection supply inlet port of the resin supply portion 1.

Thereafter, the molding die 7 is separated away from the associated die to open the cavities 3, and the ejector rods 10A of the discharge ejector device 10 are projected by the movement of the ejector moving plate 10B so that the molded articles 8 adhered in the cavities 3 are pushed and discharged.

Also, in the embodiment, the apparatus has no tapered injection nozzle portion like the conventional one but the runner portion 2 (i.e., sprue portion 2A) having substantially the same diameter of the cylinder 12 is formed. Thus, it would be difficult to clearly distinguish the runner portion 2 from the resin supply portion 1. Accordingly, the apparatus according to the embodiment has the sprue portion 2A which has a larger diameter than that of the conventional sprue portion.

Namely, in the embodiment, the resin supply portion 1 is closed by the supply portion closing portion 5B of the resin return member 5 during molding, and it is possible to perform the molding in any condition where the material in the runner portion 2 is cooled down and cured, under the semimolten condition or the molten condition. Accordingly, it is unnecessary to adopt the conventional tapered injection nozzle portion.

Accordingly, there is no supply resistance like the conventional system, and the low pressure injection of the molten resin 4 is possible. As a result, it is possible to suppress warpage or deformation of the molten articles 8 and in addition, it is possible to reduce the non-uniformity in quality of the molten articles 8 in every molding shot.

Namely, since the resin supply portion 1 is closed by the supply portion closing portion 5B of the resin return member 5, even if the diameter of the resin supply portion 1 and the runner portion 2 (i.e., sprue portion 2A) is large, it is possible to prevent the leakage of the resin without fail. There is no problem in molding the articles 8 even if the waste molded material 6 is kept under a semimolten condition in the large diameter sprue portion 2A. Accordingly, as mentioned above, it is possible to design the sprue portion 2A having the various advantages unlike the small diameter nozzle portion.

Figure 5:
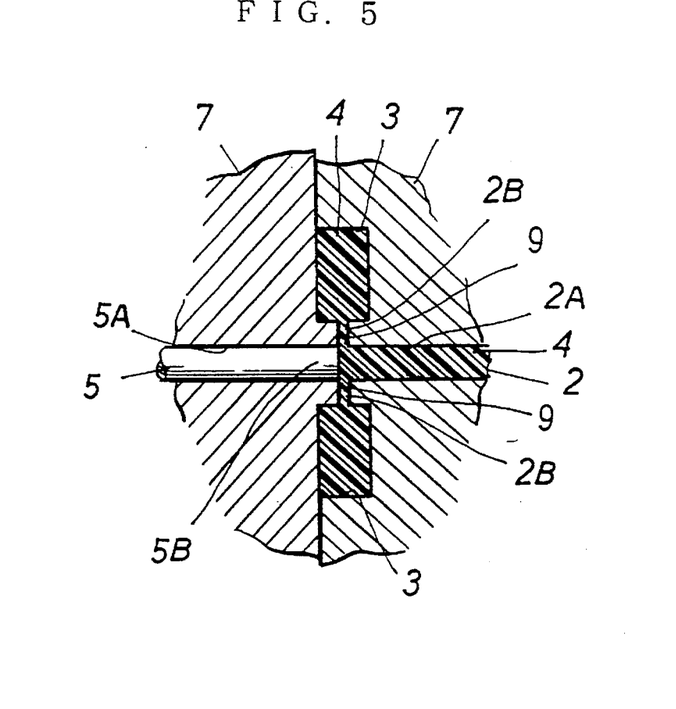
FIG. 5 is an enlarged cross-sectional view showing a primary part of the apparatus during the resin injection in accordance with a modification of the first embodiment.

Incidentally, it is possible to assume a structure as shown in FIG. 4 in which the runner portion 2 consists of the sprue portion 2A, or alternatively to assume a structure as shown in FIG. 5 in which a pair of runner portions 2B are formed in communication with the runner portion 2A. In the latter case, the sprue runners are not discharged but very small runners only remain as waste molded materials 6 integral with the molded articles.

Furthermore, it is apparent that the present invention is not limited to the specific embodiment shown and the invention may be applied to any type of the structure of the resin molding machine. In this case, the structure, molding means, moving means and the like may be made suitably in conformity with the specific molding machine.

Also, the following modification is possible. The distal end of the resin return member 5 is bifurcated to form distal end division portions (i.e., shuttle rod portions). The resin return member 5 is moved to insert the distal end division portions (shuttle rod portions) into the resin supply portion 1. As a result, the waste molded material 6 held within the sprue portion 2A is pressed and returned back to the resin supply portion 1. When the resin return member 5 is moved back to the original position, the distal end division portions are left under the condition that division portions be inserted in the resin supply portion 1. The left distal end division portions (shuttle rod portions) may be returned back through the sprue portion 2A by the next resin injection.

A second embodiment will now be described with reference to FIGS. 6 to 12 in which the same components as in the first embodiment are indicated by the same reference numerals.

A resin molding process is carried out in which a molten resin 4 is fed into a pair of right and leer cavities 3 through a pair of runner portions 2B, a sprue portion 2A and a pair of gate portions 9. The molten resin 4 is fed into the cavities 3 by the drive movement of the screw 13 and the molded articles 8 are cured within the cavities 3. Thereafter, a resin return member 5 is moved, and the waste molded material 6 kept under the cured condition is pushed and returned back to the resin supply portion 1. Then, the waste molded material 6 is returned back to the resin supply portion 1 under the molten condition by the heat of the resin supply portion. At this time, the gate portions 9 of the cavities 3 are closed by the gate portion closing portions 5A of the side portions of the resin return member 5 by the movement of the resin return member 5. The supply portion closing portion 5B of the distal end of the resin return member 5 is inserted into the resin supply portion 1 to thereby close the resin supply portion 1.

The above-described process may be carried out by the apparatus shown in FIGS. 6 to 12.

In the second embodiment shown, it may be said that the apparatus has only the so-called sprue portion 2A. The cavities 3 are arranged on the right and left sides of the sprue portion 2A, and the runner portion 2 for connecting the cavities 3 with each other is dispensed with. It may be also said that a pair of small runner portions 2B are present through the very short gate portions 9 between the sprue portion 2A and the cavities 3.

Figure 6:
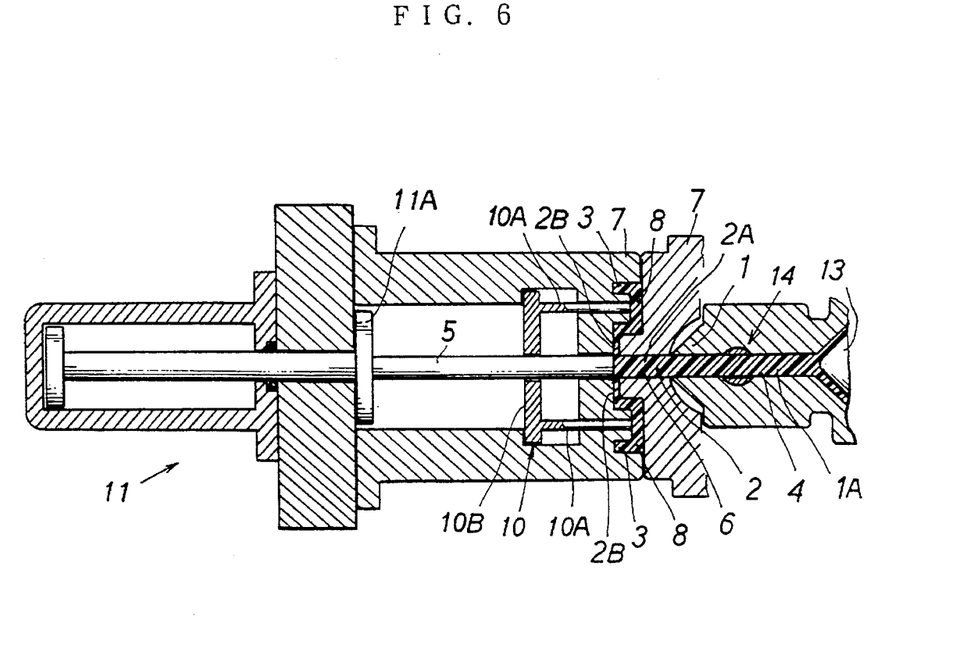
FIG. 6 is a schematic cross-sectional view of the apparatus upon the resin injection in accordance with a second embodiment.
Figure 7:
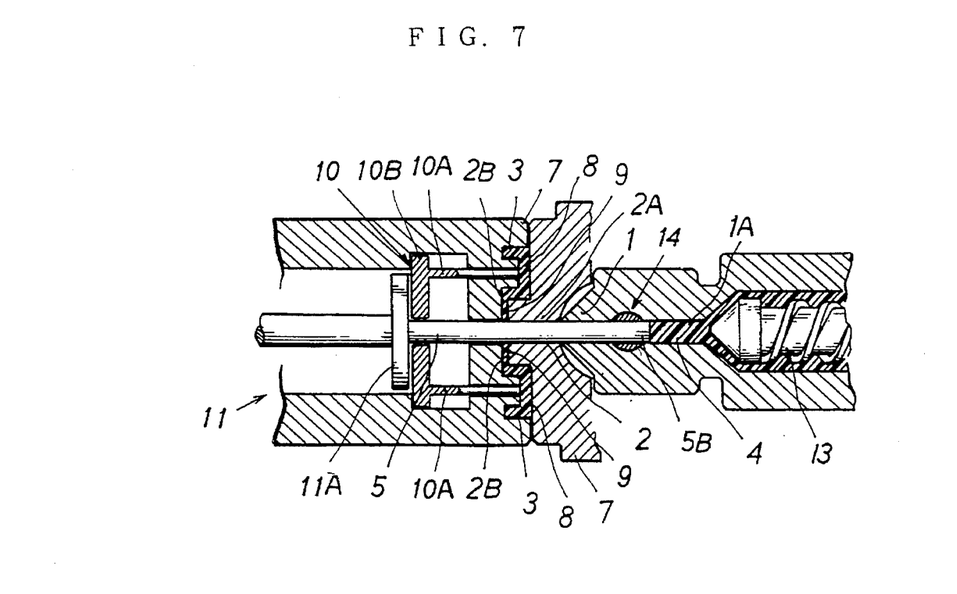
FIG. 7 is a schematic cross-sectional view of the apparatus upon the return movement of a resin return member after the resin injection in accordance with the second embodiment.
Figure 8:
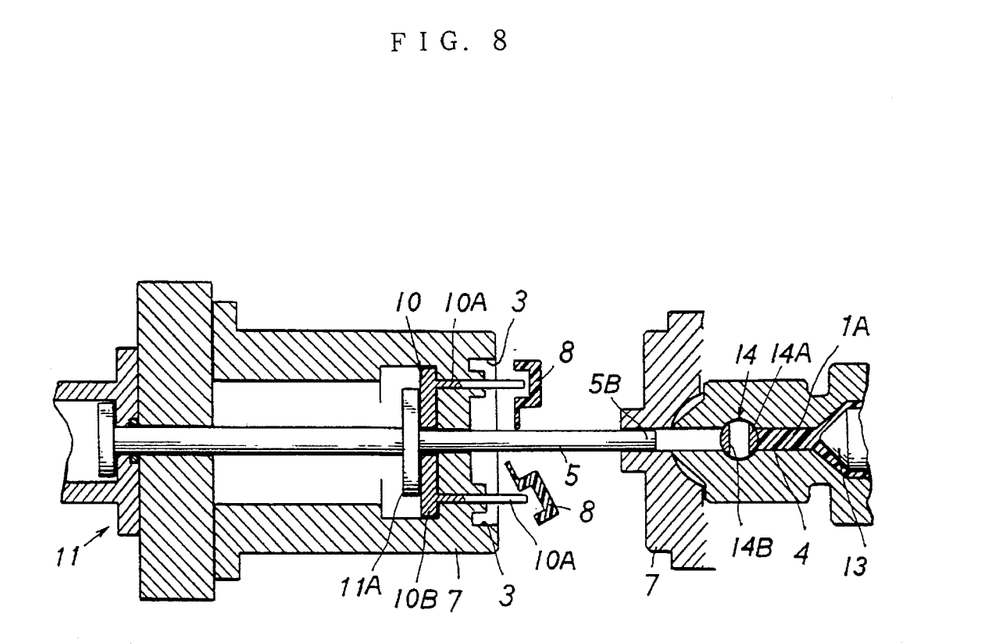
FIG. 8 is a schematic cross-sectional view of the apparatus upon the removal of molded articles in accordance with the second embodiment.
Figure 9:
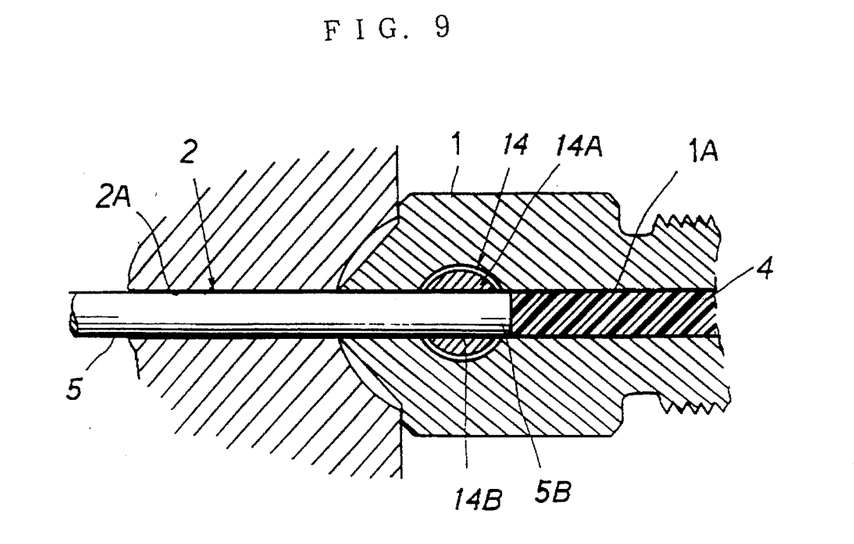
FIG. 9 is an enlarged cross-sectional view showing a primary part of the apparatus upon the movement of a resin return member after the resin injection in accordance with a second embodiment.
Figure 10:
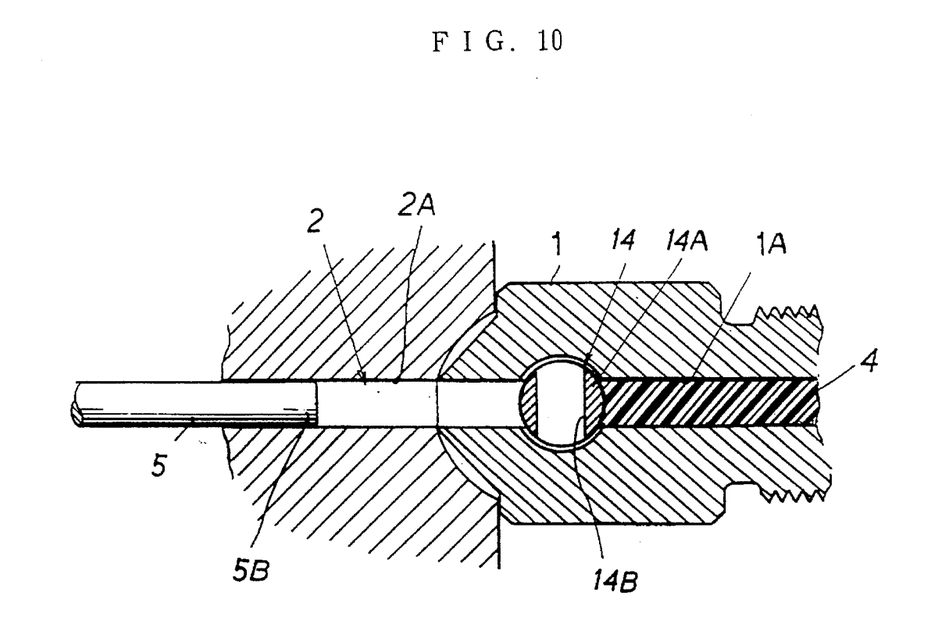
FIG. 10 is an enlarged cross-sectional view showing a primary part of the apparatus upon removal of molded articles in accordance with the second embodiment.
Figure 11:
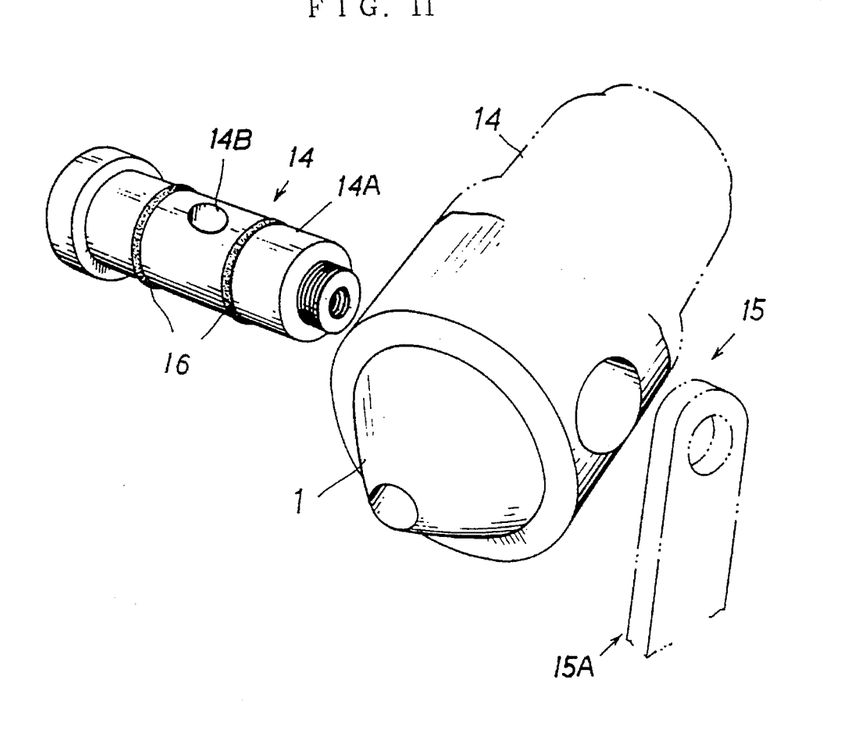
FIG. 11 is an exploded perspective view showing a plug mechanism according to the second embodiment.

In the embodiment, a return ejector device 11 is drivingly moved by a drive source of a discharge ejector device 10 for discharging molded articles 8 held within the cavities 3 by ejector rods 10A under the condition that a mold die 7 is moved away from an associated mold die to open the cavities 3. The rod-like resin return member 5 projects toward the sprue portion 2A around a moving plate 11A of the return ejector device 11.

The resin return member 5 is constructed so that its distal end may close the end portion of the sprue portion 2A before starting the movement of the moving plate 11A. After the molded articles 8 held within the cavities 3 have been hardened or cured, the moving plate 11A of the return ejector 11 is moved forwardly so that the rod-like resin return member 5 is projected into the sprue portion 2A and further moved into the resin supply portion 1. As a result, the semisolid waste molded material 6 is returned back to the resin supply portion 1. After the semisolid waste molded material 6 in the sprue portion 2A has been returned back, peripheral portions of the resin return member 5 are used as gate closing portions 5A which are adapted to close the right and left gate portions 9 serving as the supply port portions for the cavities 3. As a result, the supply port closing portion 5B formed at the distal end of the resin return member 5 is linearly moved toward the resin supply portion 1 to close the resin supply portion 1.

A movement controller for moving the resin return member 5 is composed of the return ejector device 11 and the drive source for controlling and driving the ejector device 11.

In the second embodiment, since the distal end portion (i.e., supply portion closing portion) 5B of the resin return member 5 pushes and returns the waste molded material 6 to the resin injection portion 1, the waste molded material 6 may be pushed and returned into the resin supply portion 1 without fail. Since the distal end portion or supply portion closing portion 5B of the resin return member 5 is inserted into the resin supply portion 1 and heated therein whenever the resin return member 5 pushes and returns the waste molded material, the resin is prevented from sticking to the end portion of the resin supply portion 1 so that the resin return member 5 is not prevented from moving.

The improved points of the second embodiment will now be described.

In the second embodiment, after the waste molded material 6 has been returned back to the resin supply portion 1 by the movement of the resin return member 5, the resin supply portion 1 is disabled to perform the injection by operating a plug mechanism 14 in the injection unnecessary condition up to the injection of the molten resin 4 for the next molding operation. Namely, the plug mechanism 14 is provided in the resin supply portion 1 for switching over the injection enable condition and the injection disable condition. After the waste molded material 6 has been returned back into the resin supply portion 1 by the movement of the resin return member 5, a switching mechanism 15 is provided for switching over the plug mechanism 14 in the injection unnecessary condition to disable the injection up to the injection of the molten resin 4 for the next molding operation. In particular, in this embodiment, the above-described resin return member 5 is composed of a rod-like member slidably disposed in the sprue portion 2A that is a runner portion 2. The movement controller is constructed for drivingly controlling the return ejector device 11 so that the resin return member 5 is moved with its distal end being inserted into the resin supply portion 1 and the material (sprue runner) within the sprue portion 2A which material is the waste molded material 6 is returned back into the resin supply portion 1.

As best shown in FIGS. 9 to 12, the plug mechanism 14 according to this embodiment is provided with a plug member 14A in the resin supply passage 1A in the vicinity of the nozzle end portion of the resin supply portion 1. A communication hole 14B is formed for communication of the resin supply passage 1A when the plug member 14A is rotated through 90°.

Figure 12:
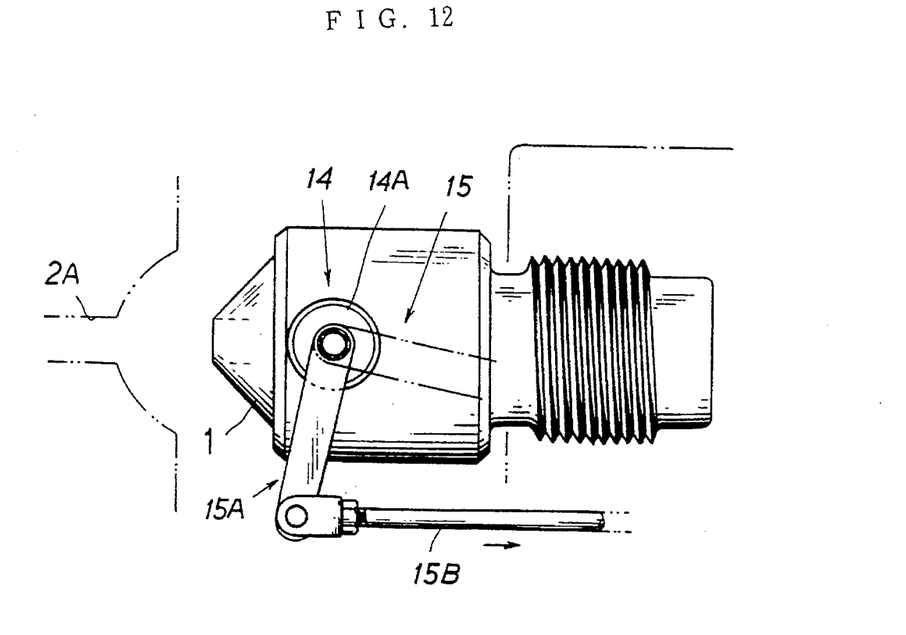
FIG. 12 is an enlarged plan view showing a mechanism for switching the plug mechanism in accordance with the second embodiment.

Furthermore, the switching mechanism 15 is provided so that the plug member 14A of the plug mechanism 14 is rotated to plug the resin supply passage 1A to disable the injection of the resin supply portion 1 and the plug member 14A is further rotated through 90° to cause the communication hole 14B to communicate with the resin supply passage 1A to disable the injection.

The switching mechanism 15 is provided with a link mechanism 15A to the plug member 14A. A movable rod 15B is connected to the link mechanism 15A for operating the link mechanism 15A. A drive source is provided for moving the movable rod 15B back and forth. The drive source is controlled so that the plug mechanism 14 is switched over by rotating the plug member 14A through the movable rod 15B and the link mechanism 15A.

Accordingly, the resin return member 5 is pushed and moved for returning the resin so that the waste molded material 6 is returned back into the resin supply portion 1. Thereafter, the mold die 7 is separated from the associated stationary mold die to open the cavities. When the resin return member 5 is retracted from the resin supply portion 1 in accordance with the mold opening movement, the switching mechanism 15 is controlled in synchronism with the mold opening movement to operate the switching of the plug mechanism 14 to bring the resin supply portion 1 into the injection disable condition without fail. When the mold die 7 is closed to the associated mold die for the next molding operation, and the molten resin 4 is again injected, the plug mechanism 14 is operated by the switching mechanism 15 to bring about the injection enable condition.

Incidentally, reference numeral 16 designates heat-insulating packings made of teflon.

With the above-described arrangement according to this embodiment, it is possible to provide an excellent resin molding method and an excellent resin molding machine to realize a runnerless system with a very simple structure and in a low cost. Also, it is possible to avoid a so-called natural leak which is not controllable so that the resin 4 is injected from the resin supply portion 1 accidentally.

Figure 13:
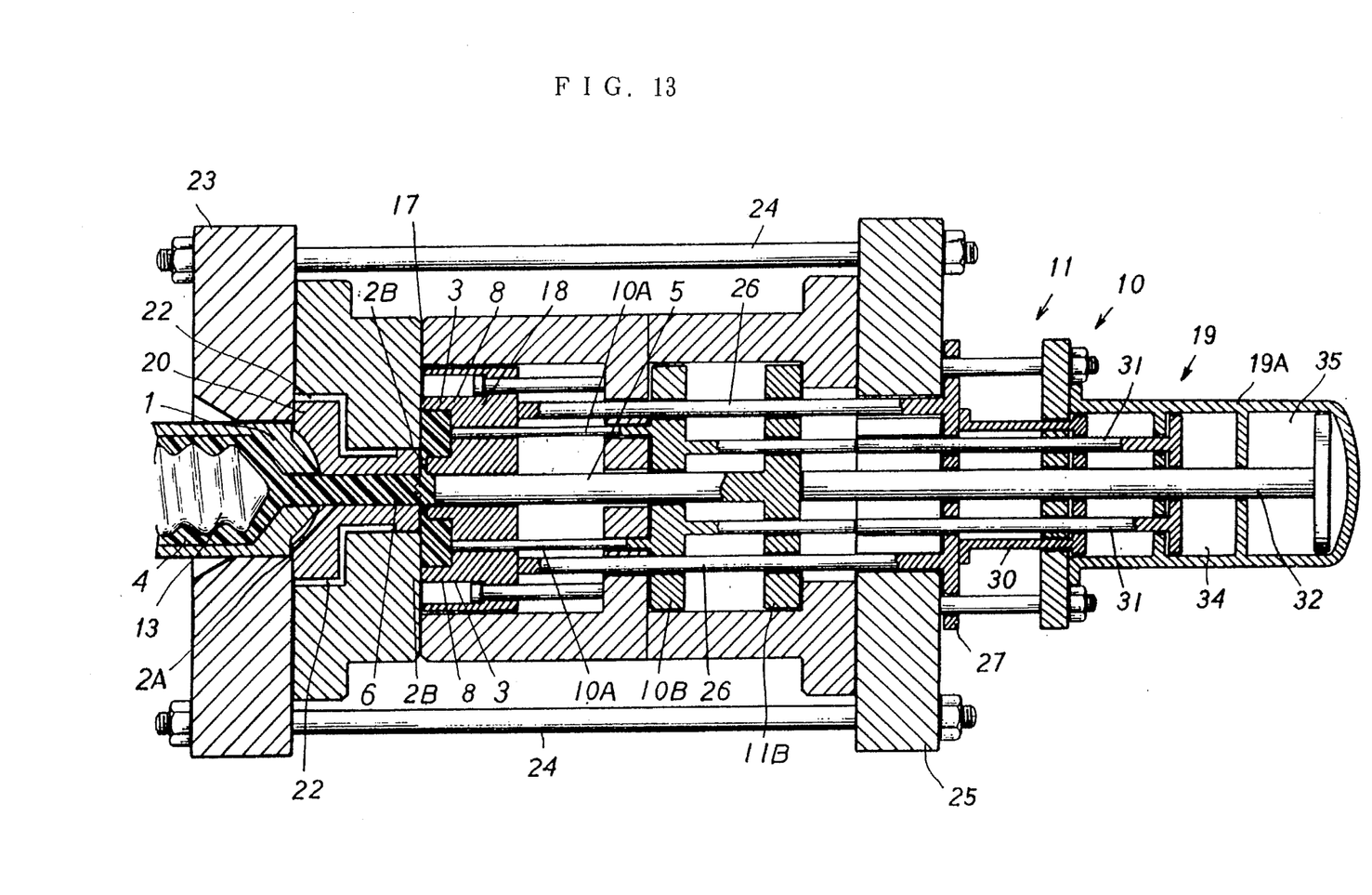
FIG. 13 is a schematic cross-sectional view showing an apparatus upon the resin injection in accordance with a third embodiment.
Figure 14:
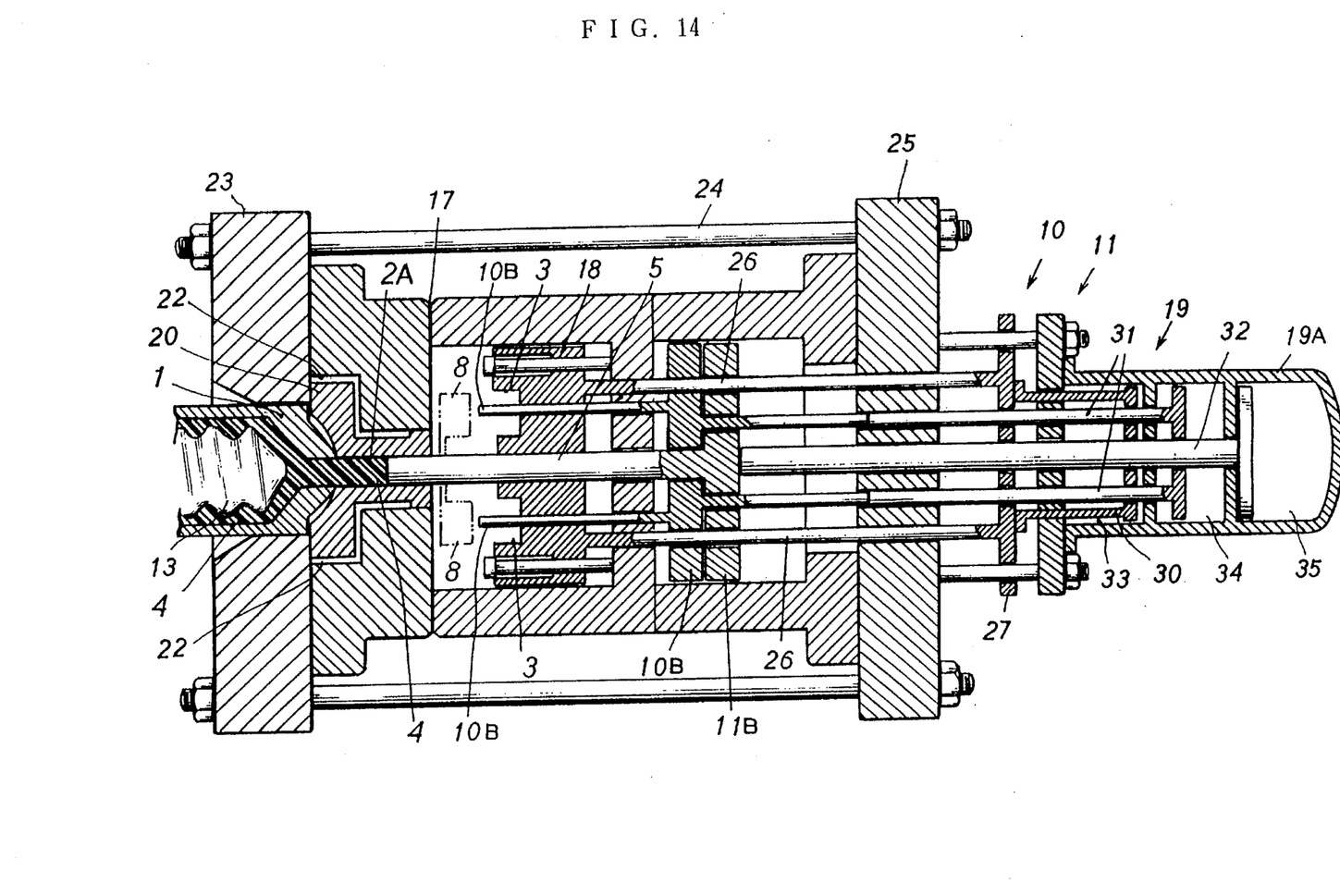
FIG. 14 is a schematic cross-sectional view showing the apparatus upon removable of molded articles in accordance with the third embodiment.
Figure 15:
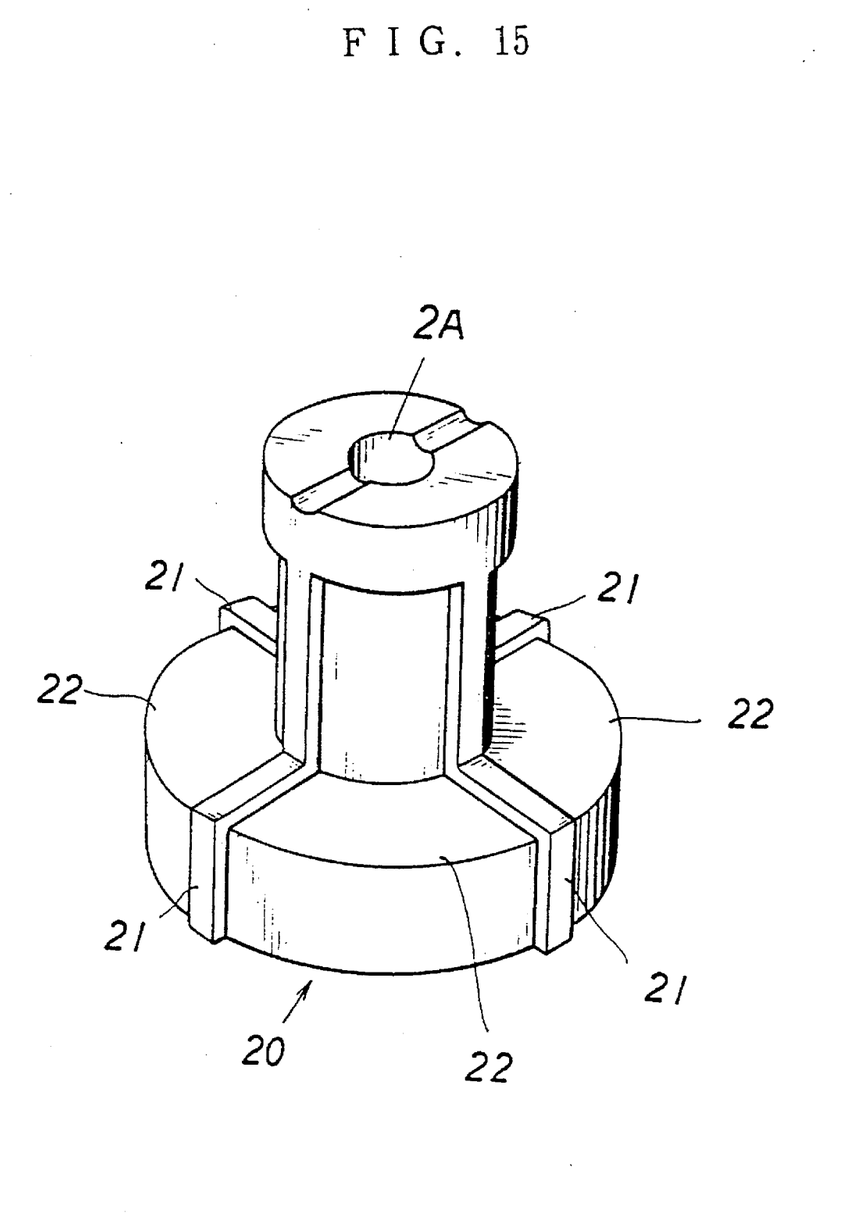
FIG. 15 is an enlarged perspective view showing a sprue block forming a sprue portion in accordance with the third embodiment.

FIGS. 13 to 15 show a third embodiment of the invention.

In this embodiment, the molding dies are divided along a parting line 17 by a mold clamping mechanism for opening/closing the cavities 3. A molding block 18 that defines a part of the cavities 3 is separatably provided on the movable die of the molds. The molding block 18 is retracted by a moving drive mechanism 19 so that the cavities 3 are opened from the parting line 17 for removing the molded articles 8 from the cavities 3. When the molded articles 8 are removed from the cavities, the mold clamping mechanism is kept unchanged and in the clamping condition. Under this condition, the molding block 18 is moved and the molded articles are discharged by the projection of the discharge ejector device 10.

When the next molding is to be carried out, the molding block 18 is moved back to the original position to close the cavities 3.

In, for example, maintenance of the cavities 3, the mold clamping mechanism is operated to open the cavities 3. In normal molding shots, the opening/closing of the cavities is carried out by slidingly moving only the block 18.

Accordingly, in order to open/close the cavities 3, it is sufficient to move the molding block 18 a short distance such that the molded articles 8 may be discharged. For this time, it is not always necessary to operate the large scale mold clamping mechanism for every molding shot. A misalignment caused by the movement of the molding block 18 would not adversely affect the cavities 3. Accordingly, the durability of the molding dies and the mold clamping mechanism is enhanced to considerably reduce a running cost.

The third embodiment is directed to a so-called non-opening/closing mold system.

Also, in this embodiment, the sprue portion 2A is provided in the stationary molding die. The sprue portion 2A is formed in a sprue block 20 to form a so-called unit type.

In the sprue block 20 has the sprue portion 2A in its interior and elongated projections 21 formed at a predetermined interval on its outer periphery. When the sprue block 20 is mounted on the stationary side of the molding dies, aerial heat insulating layers 22 are formed around the sprue portion 2A as heat insulating portions for heat-insulating the cavities 3 due to air spaces between the elongated projections 21.

According to the present invention, the molten resin 4 are not molded and discharged in the sprue portion 2A but is returned back into the resin supply portion 1. Accordingly, unlike the conventional method, it is unnecessary to cool and solidify the molten resin 4 within the sprue portion 2A.

Also, when the waste molded material is returned back to the resin supply portion 1, the material is returned back thereinto while being heated by the heat of the resin supply portion 1. Thus, it is easier to smoothly return the material for a short period of time in the molten condition than in the solid condition.

Therefore, the cavities 3 that require cooling and solidifying the material are insulated from the sprue portion 2A as much as possible, to thereby avoid the solidification of the molten resin 4 within the sprue portion 2A.

In the embodiment, in order to attain the heat insulation effect, only the sprue portion 2A is of the unit type, and the elongated projections 21 are formed so as to surround the sprue portion 2A with the aerial heat insulating layers 22. Thus, this system is superior in mass production property and inexpensive.

Incidentally, on the basis of this inventive concept, the resin return member 5 on the movable side, the resin return member 5 moving block which is in communication with the sprue portion 2A and moves the resin return member 5 back and forth, and the drive mechanism for the resin return member 5 are made into units, respectively, and these units are detachably mounted on the molds together with the sprue block 20, whereby it is possible to readily mount the sprueless mechanism according to the present invention onto the conventional molds.

A process which is carried out in accordance with the third embodiment will now be described with reference to FIGS. 13 and 14.

In FIGS. 13 and 14, reference numeral 23 denotes a stationary platen, reference numeral 24 denotes tie bars and reference numeral 25 denotes a movable platen. The movable platen 25 is moved for clamping/opening the molds by a clamping means such as a toggle mechanism to form a clamping mechanism.

The resin supply portion 1 is provided on the stationary platen 23 side for injecting and supplying the molten resin 4 by the movable screw 13.

The molten resin 4 that has been extruded from the resin supply portion 1 is filled into the two cavities 3 through the large diameter sprue portion 2A and the right and left branched runner portions 2B.

In the embodiment, the molding block 18 for defining a part of the cavities 3 is provided on the movable platen 25 side along the parting line 17. The space where the molding block 18 is moved away from the associated block is provided on the movable platen 25 side (behind the block 18).

The block driving mechanism 19 is provided behind the molding block 18 for separating and moving the molding block 18 (for opening/closing movement).

The sprue portion 2A is provided on the stationary side of the molds. The unit subsystem is adopted such that the sprue portion 2A is formed in the detachable sprue block 20.

The sprue block member 20 has the sprue portion 2A in its interior and the elongated projections 21 formed at predetermined intervals on its outer periphery as mentioned above. When the sprue block 20 is mounted on the stationary mold, the aerial heat insulating layers 22 are formed as the heat insulating portions by the gaps between the elongated projections.

The discharge ejector device 10, the block drive mechanism 19 serving also as the return ejector device 11, and the drive means for the ejector rods 10A of the discharge ejector device 10 and the resin return member 5 in the embodiment will now be described.

In the embodiment, opening/closing rods 26 are connected to a rear side of the molding block 18 for separating and moving the molding block 18 (for opening/closing back-and-forth movement). The ejector rods 10A and the resin return member 5 are arranged in parallel to each other. The block drive mechanism 19 including a hydraulic cylinder that can perform a hydraulic switching control with a single cylinder controls the movement of the components.

In FIGS. 13 and 14, reference numeral 27 denotes a moving plate from which the opening/closing rods 26 project, and reference character 10B denotes a moving plate from which the ejector rods 10A project, and reference character 11B denotes a moving plate from which the resin return member 5 projects. Connecting rods 30, 31 and 32 are projecting backwardly from the moving plates 27, 10B and 11B, respectively. These connecting rods 30, 31 and 32 are arranged in three hydraulic chambers 33, 34 and 35 of the hydraulic cylinder device 19A of the block drive mechanism 19, respectively.

Accordingly, the system will operate in accordance with the embodiment as follows. The molding operation is carried out from the mold clamping position shown in FIG. 13 to the molded article separation position shown in FIG. 14.

First, when the working oil is filled into the hydraulic chamber 35, the resin return member 5 is moved forwardly through the connecting rod 32 and the moving plate 11B to return the molten resin 4 within the sprue portion 2A into the resin supply portion 1. Thus, the above-described sprueless molding process is carried out.

Subsequently, when the working oil is supplied to the first hydraulic chamber 33, the opening/closing rods 26 are drawn through the connecting rods 30 and the moving plate 27 so that the molding block 18 is separated and moved backwardly a predetermined short distance and the cavities 3 are opened from the parting line 17.

Finally, when the working oil is supplied to the second hydraulic chamber 34, the ejector rods 10A are pushed forwardly through the connecting rods 31 and the moving plate 10B. Then, the molded articles 8 within the cavities 3 are projected to fall down and to be discharged.

Thus, after the molding articles 8 have been discharged as shown in FIG. 14, the operation is carried out in the opposite order to the above-described one. The molding block 18 is returned back to the original position to close the cavities 3 for the next molding operation.

As described above, in the normal molding operation, the clamping mechanism is not operated at all and is held under the clamping condition. Thus, the molding block 18 is moved a minimum distance for the opening/closing the molds to realize the molded article removal.

Incidentally, it is desired that the resin supply portion 1 be designed so that an inner diameter of the resin supply portion 1 is somewhat larger than an outer diameter of the resin return member 5 so as to surround the end portion of the resin return member 5 with the molten resin 4 when the distal end of the resin return member 5 is inserted into the resin supply portion 1 for returning the waste material. With such a design, it is likely that the resin (waste molded material 6) within the sprue portion 2A to be returned by the resin return member 5 would be molten instantaneously by the molten resin 4.

Accordingly, the waste molded material 6 within the sprue portion 2A is unlikely to be solidified by the above-described heat insulating portions 22. Furthermore, even if the material is solidified, when the material is pushed and returned by the resin return member 5, the waste molded material 6 is surrounded by the molten resin 4 within the resin supply portion 1 to be molten rapidly. It is therefore possible to reduce the cycle type of the molding shot. Also, it is possible to suppress the abrupt increased load to be imposed on the heater provided in the resin supply portion 1.

As described above, according to the present invention, it is possible to provide an excellent resin molding method and apparatus that realize the runnerless system (sprue runnerless system) with a simple arrangement in a low cost.

What is claimed is:

1. A resin molding apparatus in which molten resin (4) is fed from a resin supply portion (1) into a plurality of cavities (3) through a sprue portion (2A) and a plurality of runner portions (2B) branched from said sprue portion (2A) for molding the resin, said apparatus comprising:

a resin return member (5) disposed movably through said sprue portion (2A) for returning a waste molded resin (6) kept under at least one of a molten and a solid condition within said sprue portion (2A) back into said resin supply portion (1) by a heat of said resin supply portion (1) when said resin return member (5) is projected into said sprue portion (2A) and moved through said sprue portion (2A) toward said resin supply portion (1), said resin return member (5) being movable for returning back toward said resin supply portion (1), after the molten resin (4) has been fed into said cavities (3) and the molded resin within said cavities (3) has been solidified; and ejector rods (10A) movably provided for projecting into said cavities (3) and discharging the molded article (8) from said cavities (3) under the condition that a mold die (7) is moved away from an associated mold die to open the cavities (3) after the molded article (8) held within said cavities (3) has been solidified, said ejector rods (10A) being projected from an ejector plate (10B) so that said ejector rods (10A) are moved with a movement of said ejector pate (10B);

wherein one of said resin return member (5) and a movable rod for pushing the resin return member (5) extends through said ejector plate (10B), and a common drive source is provided for controlling and driving together said ejector plate (10B) and said resin return member (5) and said movable rod for pushing the resin return member (5), respectively.

2. The apparatus according to claim 1, wherein said common drive source is composed of a hydraulic drive source.

3. The apparatus according to claim 1, wherein said ejector plate and said resin return member or said movable rod for pushing said resin return member is movable in the same direction and controlled and driven by a drive source which is in common with each other.

4. The apparatus according to claim 1, wherein a plug mechanism is interposed in said resin supply portion (1) for switching over between an injection enable condition and an injection disable condition, and a switching mechanism is provided for operating said plug mechanism for the injection disable condition in an injection unnecessary condition up to a next injection for molding resin after the waste molded material (6) has been returned back into said resin supply portion (1) by the movement of said resin return member (5).

5. The apparatus according to claim 1, wherein said common drive source is composed of a hydraulic drive source, said ejector plate and said resin return member or said movable rod for pushing said resin return member is movable in the same direction and controlled and driven by a drive source which is in common with each other, a plug mechanism is interposed in said resin supply portion (1) for switching over between an injection enable condition and an injection disable condition, and a switching mechanism is provided for operating said plug mechanism for the injection disable condition in an injection unnecessary condition up to a next injection for molding resin after the waste molded material (6) has been returned back into said resin supply portion (1) by the movement of said resin return member (5).

6. The apparatus according to claim 1, wherein a heat insulating portion is provided around said sprue portion (2A) for heat-insulating said cavity (3) and said sprue portion (2A).

* * * * *

UNITED STATES PATENT AND TRADEMARK OFFICE
CERTIFICATE OF CORRECTION

PATENT NO. : 5,460,508
DATED : October 24, 1995
INVENTOR(S) : Masakazu Ohno, Chuzo Simizu and Osamu Nakazawa It is certified that error appears in the above-indentified patent and that said Letters Patent is hereby corrected as shown below:

On the title page, item [54] and column 1, lines 1-2, delete the title and insert therefor --RESIN MOLDING APPARATUS INCLUDING A RESIN RETURN MEMBER--;

Column 6, line 9, delete "leer" and insert --left--;

Column 11, line 42, delete "pate" and insert --plate--.

Signed and Sealed this

Second Day of April, 1996

Attest:

BRUCE LEHMAN

Attesting Officer     Commissioner of Patents and Trademarks